(12) United States Patent
Nederveen et al.

(10) Patent No.: US 6,853,623 B2
(45) Date of Patent: Feb. 8, 2005

(54) REMOTE MONITORING OF SWITCH NETWORK

(75) Inventors: Paul Johan Nederveen, Raleigh, NC (US); Robert Leroy King, Garner, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/263,362

(22) Filed: Mar. 5, 1999

(65) Prior Publication Data

US 2003/0185152 A1 Oct. 2, 2003

(51) Int. Cl.[7] .............................. H04J 3/14; H04Q 11/00
(52) U.S. Cl. ...................... 370/250; 370/386; 340/3.1; 340/825.02
(58) Field of Search ................................. 370/241, 250, 370/254, 357, 360, 361, 386, 387, 388, 446, 447, 462, 408; 340/825.02, 2.1, 2.6, 3.1; 707/10, 217, 223, 224, 226, 230; 709/217, 223, 224, 226, 230

(56) References Cited

U.S. PATENT DOCUMENTS

| | | | |
|---|---|---|---|
| 5,485,455 A | | 1/1996 | Dobbins et al. ............ 370/255 |
| 5,678,006 A | | 10/1997 | Valizadeh et al. .......... 709/223 |
| 5,835,914 A | * | 11/1998 | Brim .......................... 707/206 |
| 6,092,214 A | * | 7/2000 | Quoc et al. ..................... 714/4 |
| 6,243,756 B1 | * | 6/2001 | Whitmire et al. ............ 709/232 |
| 6,327,620 B1 | * | 12/2001 | Tams et al. .................. 709/224 |
| 6,335,935 B2 | * | 1/2002 | Kadambi et al. ............ 370/396 |

OTHER PUBLICATIONS

*TCP/IP*, second edition, running a successful network, Kevin Washburn, Jim Evans, Addison Wesley Longman, second edition printed 1996. Reprinted 1997. pp. 161–163, 445–464.
*Computer Networks*, Third Edition, Andrew S. Tanenbaum, Prentice Hall, 1996, pp. 630–643.
*Cisco—Catalyst 5500/5000 Series Network Analysis Module*, web http:www.cisco.com/warp/public/729/c5000/nam_ds.htm, pp. 1–5.
*RMON Overview*, web, http://support.baynetworks.com/lib . . . 1/router/soft1101/114070B/N 24.HTM, pp. 1–5.
*Cisco—Catalyst 3100 Stackable Switch*— web–http://www.cisco.com/warp/public/729/c3100₊pa.htm, pp. 1–4.

(List continued on next page.)

*Primary Examiner*—Alpus H. Hsu
(74) *Attorney, Agent, or Firm*—Cesari and McKenna, LLP; A. Sidney Johnston

(57) ABSTRACT

A technique for use in gathering network activity-related information from cascaded network switches is provided. Using this technique, the information can be gathered without substantially reducing performance of the cascaded switches. In one embodiment, a single remote monitoring probe is connected via respective connections to each of the switches so as to receive the information from the switches. In another embodiment, only one of the switches is connected to the probe, and the other switches transmit their respective portions of the information to the switch connected to probe. The switch connected to the probe provides these portions of the information, as well as, any of its respective activity-related information to the probe. In this latter embodiment, the switches may be connected by dedicated connections and switch ports that are used solely for communicating the activity-related information.

11 Claims, 5 Drawing Sheets

OTHER PUBLICATIONS

*Cisco—RMON on the Workgroup Catalyst 1200 Series, RM on the Workgroup Catalyst Series* Revised Apr. 3, 1998, Web, http://www.cisco.com/warp/public/701/25.html pp. 1–5.

*Installing the Catalyst 3900*, Documentation, web, http://www.cisco.com/univercd/cc/t . . . ct/lan/cat3900/c939Oug/install.htm, pp. 1–11.Catalyst.

*Catalyst 3000 Stack Theory of Operation*, Documentation, web, http://www.cisco.com/univercd/cc/t . . . oduct/lan/cat3ks/3000/adopstck.htm, pp. 1–5.

*Interconnecting Catalyst 3900 Token Ring Switches*, web, http://www.cisco.com/univercd/cc/t . . . t/lan/cat3900/c3930ug/planning.htm, pp. 1–6.

*Cisco—RMON—Catalyst Workgroup Switch, Customer Profile: Synopsys, Inc.*, web, http://www.cisco.com/warp/public/614/4.html, pp. 1–6.

*Cisco—Remote Monitoring for Switched Internetworks (RMON and RMON2), Additional general information about Cisco switching solutions*, web, http://www.cisco.com/warp/public/729/Manage/rmon2_wp.htm, pp. 1–6.

* cited by examiner

REMOTE MONITORING OF SWITCH NETWORK

BACKGROUND OF THE INVENTION

1. Field of the Invention

The present invention relates generally to computer network management, and more specifically, to the remote monitoring of switch networks for purposes of facilitating management of such networks.

2. Brief Description of Related Prior Art

Data communication in a computer network involves data exchange between two or more entities interconnected by communication links and subnetworks. These entities are typically software programs executing on hardware computer platforms, such as end-stations and intermediate stations. Examples of an intermediate station may be a router or switch which interconnects the communication links and subnetworks to enable transmission of data between the endstations. A local area network (LAN) is an example of a subnetwork that provides relatively short distance communication among the interconnected stations, whereas a wide area network enables long distance communication over links provided by public or private telecommunications facilities.

Communication software executing on the endstations correlate and manage data communication with other endstations. The stations typically communicate by exchanging discrete packets or frames of data according to predefined protocols. In this context, a protocol consists of a set of rules defining how the stations interact with each other. In addition, network routing software executing on the routers allow expansion of communication to other endstations. Collectively, these hardware and software components comprise a communications network and their interconnections are defined by an under-lying architecture.

Modern communications network architectures are typically organized as a series of hardware and software levels or "layers" within each station. These layers interact to format data for transfer between, e.g., a source station and a destination station communicating over the network. Predetermined services are performed on the data as it passes through each layer and the layers communicate with each other by means of the predefined protocols. The lower layers of these architectures are generally standardized and are typically implemented in hardware and firmware, whereas the higher layers are generally implemented in the form of software running on the stations attached to the network. An example of such a communications architecture is the Internet communications architecture.

The Internet architecture is represented by five layers which are termed, in ascending interfacing order, physical interface, data link, network, transport and application layers. These layers are arranged to form a protocol stack in each communicating station of the network. FIG. 1 illustrates a schematic block diagram of prior art Internet protocol stacks 125 and 175 used to transmit data between a source station 110 and a destination station 150, respectively, of a network 100. As can be seen, the stacks 125 and 175 are physically connected through a communications channel 180 at the interface layers 120 and 160. For ease of description, the protocol stack 125 will be described.

In general, the lower layers of the communications stack provide internetworking services and the upper layers, which are the users of these services, collectively provide common network application services. The application layer 112 provides services suitable for the different types of applications using the network, while the lower interface layer 120 accepts industry standards defining a flexible network architecture oriented to the implementation of LANs.

Specifically, the interface layer 120 comprises the physical interface layer 126, which is concerned with the actual transmission of signals across the communication channel and defines the types of cabling, plugs and connectors used in connection with the channel. The data link layer (i.e., "layer 2") 121 is responsible for transmission of data from one station to another and may be further divided into two sublayers: Logical Link Control (LLC 122) and Media Access Control (MAC 124).

The MAC sublayer 124 is primarily concerned with controlling access to the transmission medium in an orderly manner and, to that end, defines procedures by which the stations must abide in order to share the medium. In order for multiple stations to share the same medium and still uniquely identify each other, the MAC sublayer defines a hardware or data link address called a MAC address. This MAC address is unique for each station interfacing to a LAN. The LLC sublayer 122 provides communications services between devices in the network.

The primary network layer protocol of the Internet architecture is the Internet protocol (IP) contained within the network layer 116 (i.e., "layer 3"). IP is a network protocol that provides network routing and that relies on transport protocols for end-to-end reliability. An example of such a transport protocol is the Transmission Control Protocol (TCP) contained within the transport layer 114. The term TCP/IP is commonly used to refer to the Internet architecture. (See, e.g., Tanenbaum, *Computer Networks, Third Ed.*, Prentice Hall PTR, Upper Saddle, River, N. J., 1996).

Data transmission over the network 100 therefore consists of generating data in, e.g., sending process 104 executing on the source station 110, passing that data to the application layer 112 and down through the layers of the protocol stack 125, where the data are sequentially formatted as a frame for delivery onto the channel 180 as bits. Those frame bits are then transmitted over an established connection of channel 180 to the protocol stack 175 of the destination station 150 where they are passed up that stack to a receiving process 174. Data flow is schematically illustrated by solid arrows.

Although actual data transmission occurs vertically through the stacks, each layer is programmed as though such transmission were horizontal. That is, each layer in the source station 110 is programmed to transmit data to its corresponding layer in the destination station 150, as schematically shown by dotted arrows. To achieve this effect, each layer of the protocol stack 125 in the source station 110 typically adds information (in the form of a header) to the data generated by the sending process as the data descends the stack.

For example, the network layer encapsulates data presented to it by the transport layer within a packet having a network layer header. The network layer header contains, among other information, source and destination (logical) network addresses needed to complete the data transfer. The data link layer, in turn, encapsulates the packet in a frame that includes a data link layer header containing information required to complete the data link functions, such as (physical) MAC addresses. At the destination station 150, these encapsulated headers are stripped off one-by-one as the frame propagates up the layers of the stack 175 until it arrives at the receiving process.

A router is a conventional intelligent intermediate station that implements network services such as route processing, path determination and path switching functions. The router also provides interfaces for a wide range of communication links and subnetworks. The route processing function allows a router to determine the type of routing needed for a packet, whereas the path switching function allows a router to accept a packet on one interface and forward it on a second interface. The path determination, or forwarding decision, function enables the router to select the most appropriate interface for forwarding a packet.

A switch is another conventional type of intermediate network station that provides the basic functions of a bridge, including filtering of data traffic by MAC address, "learning" and forwarding of the frame based on information contained in the data link (MAC) header. One conventional network switching technique involves forming a cascaded switch network by coupling multiple physical switches together via suitable bus connection links (which may comprise additional circuitry), and programming the switches' internal control and forwarding circuitry (switch network management, bridge forwarding, etc. circuitry) so as to permit the switches to operate, in essence, from the viewpoint of network stations external to the switches, as a single virtual switch. One technology for implementing such cascaded switch networks is commercially available from the Assignee of the subject application under the name of Catalyst Matrix™. Such cascaded switch networks will hereinafter be referred to as "stacked switches" or "switches in a stacked configuration."

It is also typical for a computer data network to include network management facilities. One well-known conventional protocol facilitating such management is provided by the Simple Network Management Protocol (SNMP). According to the SNMP, network management is performed at network management station or stations which execute management processes that communicate with SNMP agent processes executing on managed network nodes. Each agent process maintains a local database of variables that describe its state and history, and affect its operation. These variables are called "objects," and the collection of possible objects in a network station/node is comprised in a data structure called the Management Information Base (MIB). The management station or stations manage the network by using the SNMP to query the agents for the states of their respective local objects and/or to command the agents to change the states of their respective local objects.

SNMP agents determine the states of a portion of their respective local objects to report to the management processes based upon data generated and/or received by the respective nodes being monitored by those agents (hereinafter referred to as "raw data"). The amount of network system processing bandwidth consumed by SNMP agents in analyzing such raw data to determine the states of their respective local objects can be significant. Thus, in order to increase the amount of network system processing bandwidth that is devoted to processing of tasks that are of primary importance to the network (e.g., processing and forwarding of user data messages), it is desirable to reduce or eliminate the need for certain network components' (e.g., network switches') SNMP agents to gather and process such raw data. This can be accomplished by offloading the tasks required to make such determinations to separate network entities (e.g., remote monitoring (RMON) probes) specially designed to carry out such tasks. These special RMON entities monitor operation of network components and determine the states of their respective local objects for the components based upon raw data obtained by such monitoring, which local objects may be reported to management processes. Alternatively, the entities may gather the raw data from the network components being monitored, and may report the gathered raw data (and/or statistical information generated therefrom) to the management processes. The raw data, objects, and/or statistical information reported by such RMON entities to network management processes is hereinafter collectively and/or separately referred to as "network management-related information."

Such specialized network entities may be used to gather and process raw data from stacked switches. For example, in one conventional monitoring arrangement, each switch in the stacked configuration may be coupled to a respective RMON probe. The probes may gather appropriate raw data (e.g., packets received and/or transmitted from switch ports of the stacked switches), and provide to network management processes network management-related information from the raw data.

Unfortunately, the RMON probes used in the aforedescribed conventional stacked switch monitoring arrangement typically are quite expensive. Thus, in order to reduce cost, it has been proposed to minimize the number of such probes used in the network. For example, in another conventional stacked switch monitoring arrangement, only a single RMON probe is employed, and the single probe is directly coupled to only one of the stacked switches. Raw data from switches in the stacked configuration that are not directly coupled to the probe is transmitted to the switch that is directly coupled to the probe via any intervening switches and bus link connections in the stack. Unfortunately, the transmission of raw data via intervening switches and bus link connections may consume a substantial amount of stacked switch communications bandwidth. Disadvantageously, this can degrade the performance of the stacked switches.

Thus, it would be desirable to provide a stacked switch monitoring technique that permits efficient offloading of raw data processing from the stacked switches, requires only a minimal number of specialized network entities to gather and process such raw data, and does not result in substantial degradation of stacked switch performance.

SUMMARY OF THE INVENTION

Accordingly, the present invention provides a technique for remote monitoring of a switch network that overcomes the aforesaid and other disadvantages and drawbacks of the prior art. More specifically, in one aspect of the present invention, a technique is provided for gathering information that may be useful in network management (e.g., switch port activity-related information), from switches in the network that are in a stacked configuration. The information is gathered from the stacked switches by a single network entity (e.g., an SNMP remote monitoring probe) in such a way that it does not substantially degrade the performance of the switches. This is accomplished, in one embodiment of the technique of the present invention, by connecting the switches via respective connections to a multiplexer that selectively connects the switches, according to an arbitration scheme, to the single network entity. The entity gathers respective portions of the information from switches when it is connected to the switches by the multiplexer. The information gathered by the entity may be provided to another network entity (e.g., an SNMP management node) in order to permit the other entity to use that information in managing the network.

In another embodiment of the technique of the present invention, only one of the switches is connected to the single information gathering entity. The switches that are not connected to the entity transmit, via respective dedicated ports and connections (i.e., ports and connections that are used solely for network information gathering activities), their respective portions of the information to the switch that is connected to the entity. The switch that is connected to the entity transmits, via a respective dedicated port and connection, the information received from the other switches, as well as, its own information to the entity.

These and other advantages of the present invention will become apparent as the following Detailed Description proceeds and upon reference to the Drawings, wherein like numerals depict like parts, and in which:

Figure 1:
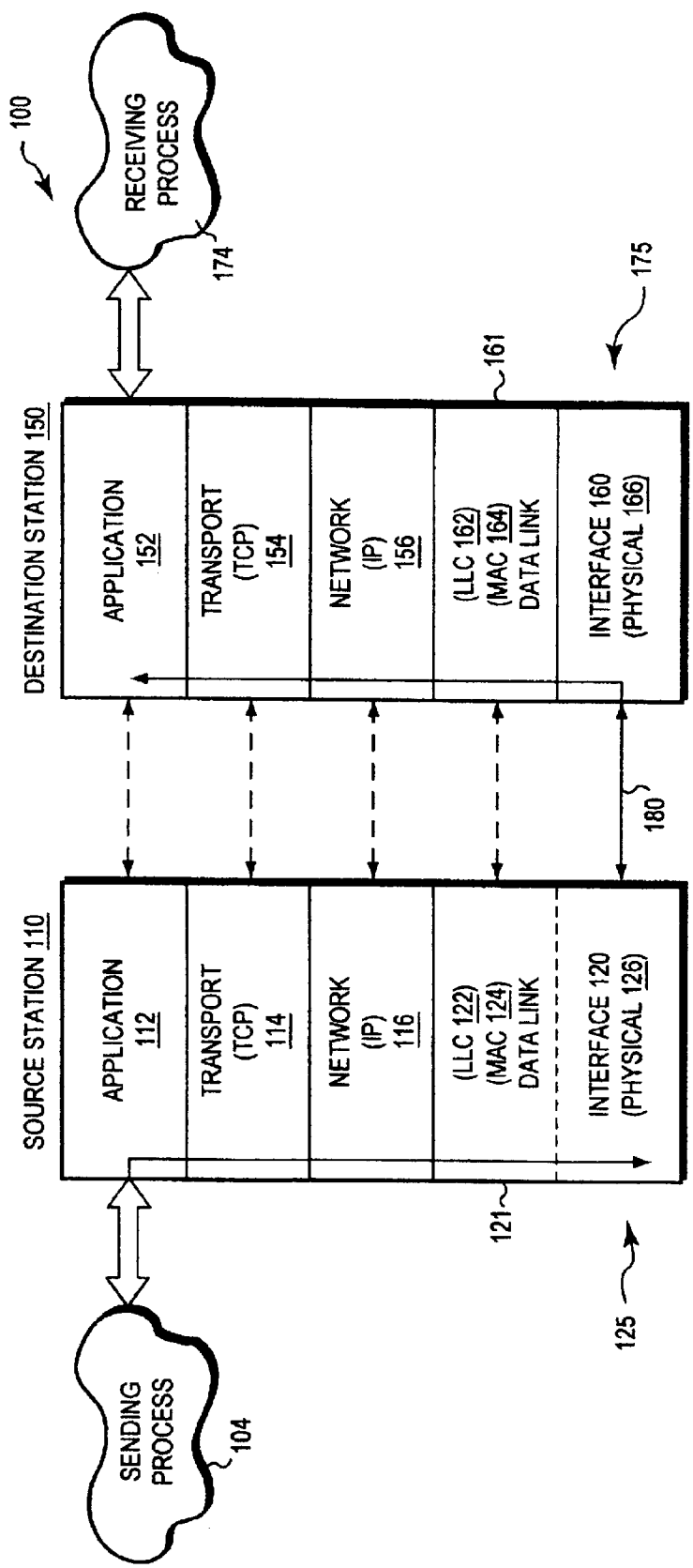
FIG. 1 is a highly schematic block diagram of prior art communications architecture protocol stacks used to transmit data between stations of a computer network.
Figure 2:
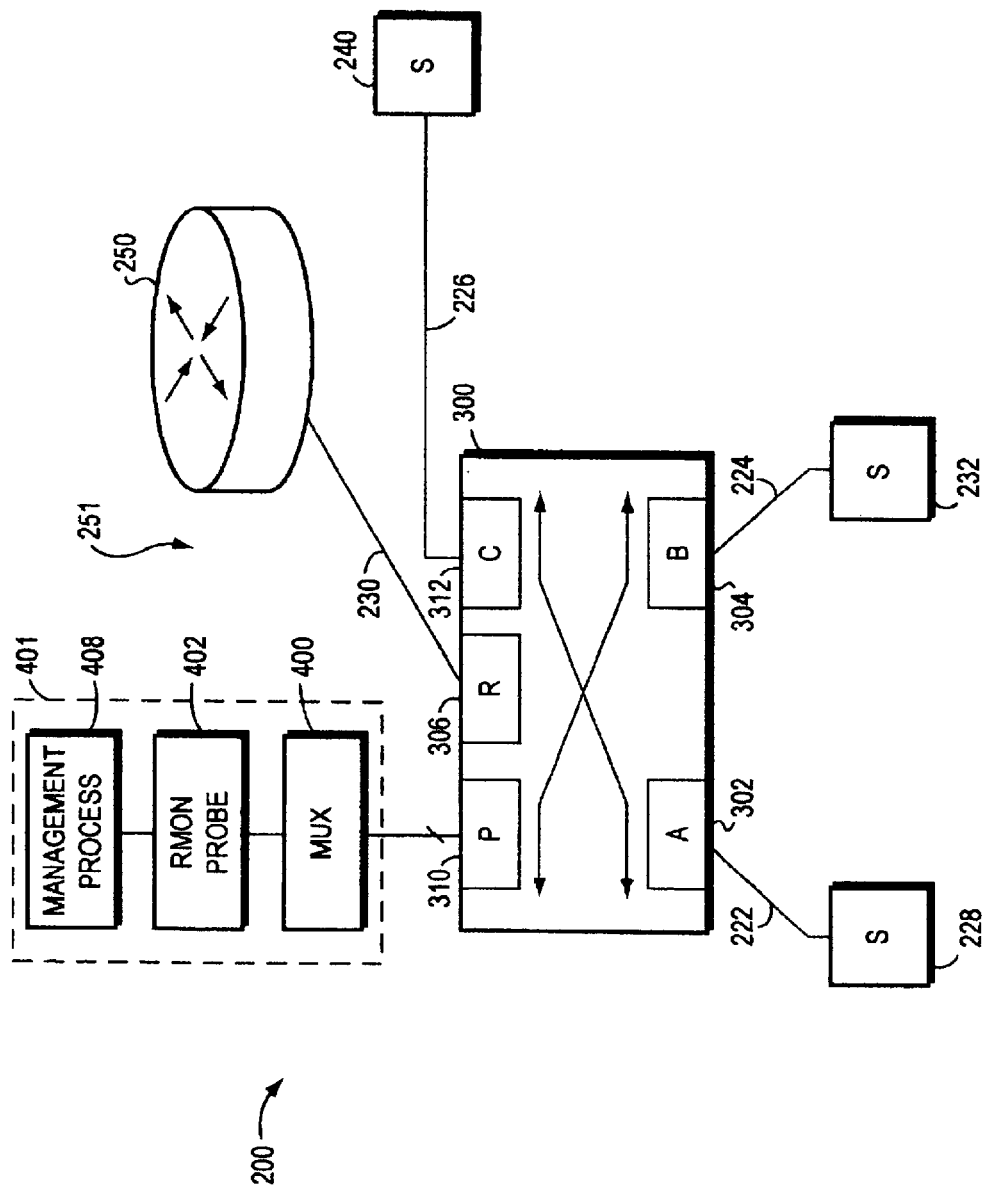
FIG. 2 is a highly schematic, functional block diagram of a computer network comprising a stacked switch network, and wherein an embodiment of the present invention is advantageously practiced.

Although the following Detailed Description will proceed with reference being made to illustrative embodiments and methods of use, it should be understood that the present invention is not intended to be limited to these embodiments and methods of use. Rather, the present invention should be viewed broadly as being of broad scope limited only as set forth in the hereinafter appended claims.

DETAILED DESCRIPTION OF ILLUSTRATIVE EMBODIMENTS

FIGS. 2–5 illustrate features of a computer network 200 wherein embodiments of the present invention may be advantageously practiced. Network 200 comprises a stacked switch network 300 which interconnects a plurality of network segments 228, 232, 240, and 251. Each segment 228, 232, 240 comprises one or more local area networks having computer endstations (not shown). Segment 251 is a network router segment that comprises network router 250. Each segment 228, 232, 240 is coupled via a respective communications link 222, 224, 226 to a respective port 302 (i.e., port A), 304 (i.e., port B), 312 (i.e., port C) of the switch network 300. Likewise, the router 250 of router segment 251 is coupled via a respective trunk line 230 to router port 306 (i.e., port R).

Each of the router 250, switches 300A, 300B, 300C (whose function and operation will be described more fully below), and endstations (not shown) of the segments 228, 232, 240, 251 typically comprises a plurality of interconnected elements, such as one or more processors, memories (e.g., random and read only memories, and mass storage devices), and network adapters. The memory may comprise storage locations addressable by the processor and adapter for storing software programs and data structures. The processor may comprise processing elements or logic for executing the software programs and manipulating the data structures. An operating system, portions of which are typically resident in memory and executed by the processor, functionally organizes the stations by, inter alia, invoking network operations in support of software processes executing on the station. It will be apparent to those skilled in the art that other processor and memory means, including various computer readable media, may be used for storing and executing program instructions pertaining to the techniques described herein. Specific features and components of the switch network 300 are described in greater detail below.

Communications among the router 250, endstations (not shown), and network 300 are typically effected by exchanging discrete data frames or packets between the communicating nodes according to a conventional, predefined protocol. For example, in network 200, all message packets sent or received from the switch network 300 via ports 302, 304, 306 may be Ethernet frames. Each Ethernet frame sent or received by the switch network 300 may include at least a MAC header, data field, and checksum field. The MAC header may include destination and source MAC address fields and a protocol type field that identifies the protocol (e.g., IP, IPX, AppleTalk, DECNet, etc.) of the data carried by the frame. The data field may contain IP header and message fields. The IP header field may contain, among other things, the IP source and destination addresses.

Figure 3:
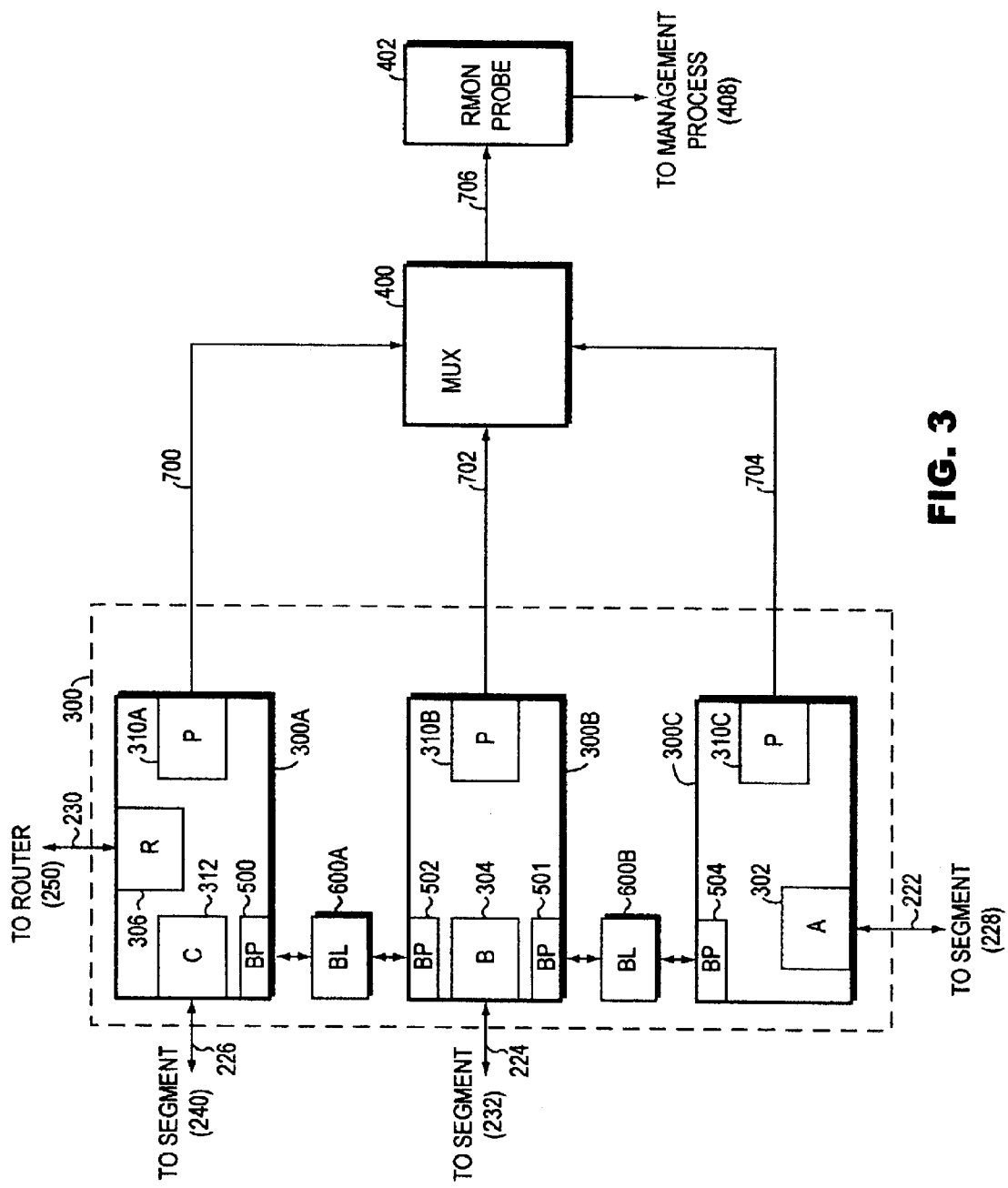
FIG. 3 is a schematic, functional block diagram illustrating in greater detail the construction of the stacked switch network shown in FIG. 2.
Figure 4:
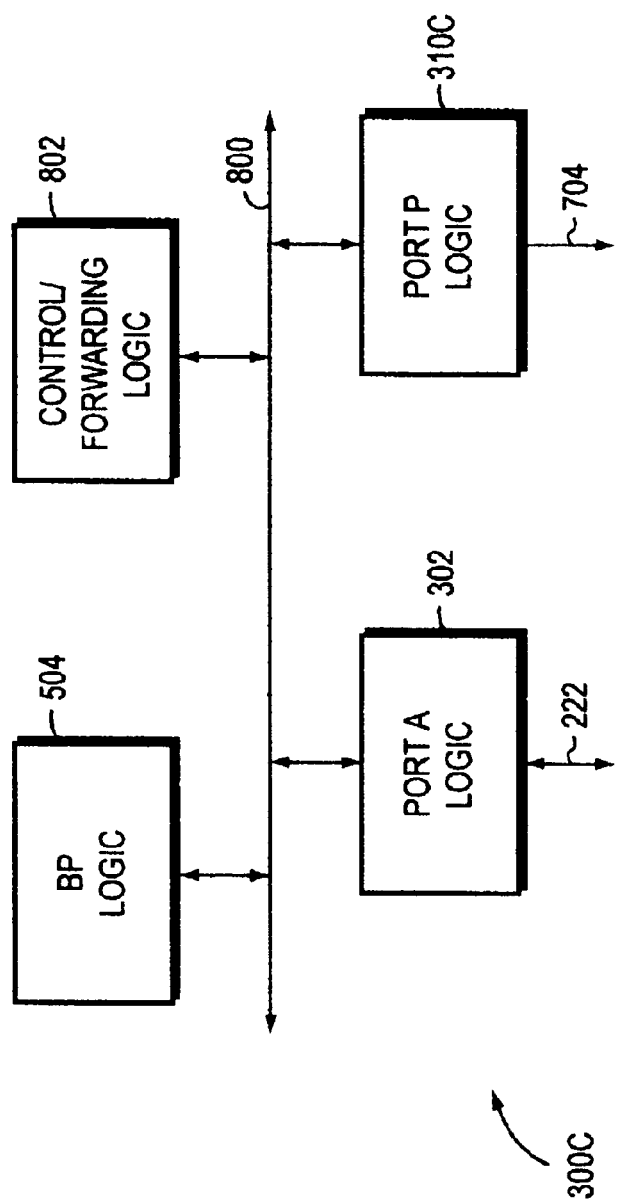
FIG. 4 is a highly schematic, functional block diagram illustrating construction of one of the switches in the stacked switch network shown in FIG. 2.

Stacked switch network 300 comprises a plurality of data network switches 300A, 300B, 300C (e.g., Catalyst 3900™ series switches of the type commercially available from the Assignee of the subject application) coupled together via conventional stack link bus connection logic 600A, 600B. More specifically, logic 600A couples a stack link bus port and associated logic 500 in switch 300A to a stack link bus link port and associated logic 502 in switch 300B. Similarly, logic 600B couples another stack link bus port and associated logic 501 in switch 300B to a stack link bus port and associated logic 504 in switch 300C. It should be understood that although, as is shown in FIG. 3, switches 300A and 300B, and switches 300B and 300C, may be coupled serially together by separate respective logic elements 600A, 600B, each of the switches 300A, 300B, 300C may be coupled together via a single respective stack link bus port in the switch to a single stack link bus connection logic block (not shown, e.g., of the type that is commercially available under the tradename Catalyst Matrix™ from the Assignee of the subject application). Further alternatively, depending upon the particular design and functionality of the ports 500, 501, 502, and 504, and the control and forwarding logic (whose operation will be described more fully below) in the switches 300A, 300B, 300C, the circuitry in logic 600A, 600B may instead be comprised in the ports 500, 501, 502, and 504 and/or control and forwarding logic, and therefore, in this alternative configuration, the logic 600A, 600B in the network 300 may be replaced by simple connection means (e.g., cable connectors).

Each switch 300A, 300B, 300C includes a respective internal bus (e.g., element 800 in switch 300C) that is coupled via at least one stack link bus port and associated interface logic (e.g., 504 in switch 300C) to external stack link bus connection logic (e.g., element 600B in switch 300C). Each switch 300A, 300B, 300C also includes respective programmable control and forwarding logic (e.g., element 802 in switch 300C) comprising processing, memory, and other circuitry for storing and learning configuration information (e.g., source and destination MAC addresses of messages received by the switch, switch bridging table, switch segments' spanning tree and virtual local area network information, etc.), and for providing appropriate commands to other elements (e.g., the switch ports) to cause data messages received by the switch to be forwarded to appropriate network segments coupled to the switch based upon this configuration information. In each switch, the switch's port logic circuitry (e.g., port A logic 302 and port P logic 310C in switch 300C) and control and forwarding logic are coupled to each other via that switch's respective internal bus. The stack link bus port and associated logic in each switch 300A, 300B, 300C may comprise a Catalyst™ stack port line interface card (commercially available from the Assignee of the subject application) inserted into a bus expansion slot (not shown) in the switch. Although not shown in the Figures for purposes of clarity of illustration, each switch 300A, 300B, 300C in network 300 typically will include tens or hundreds of ports coupled to network segments.

The control and forwarding logic and stack link bus port and associated logic in each switch, and the logic 600A, 600B, are configured to together implement conventional techniques for permitting the switches 300A, 300B, 300C to function together as a single logical/virtual switch. More specifically, when configured in the stacked arrangement 300, after the switches 300A, 300B, 300C and logic 600A, 600B are initially activated, they execute initial power-on self-diagnostics, and thereafter, enter a "stack discovery" mode of operation.

In the stack discovery mode of operation, the control and forwarding logic in each switch 300A, 300B, 300C first "senses" that its switch is coupled to logic 600A and/or 600B, and then determines the particular configuration of the stacked switch network 300, using suitable conventional autosensing/autoconfiguration techniques. The control and fowarding logic in the switches 300A, 300B, 300C then assigns to the switches respective unique identification numbers (e.g., based upon unique identification numbers of respective ports of the logic 600A, 600B to which the switches are coupled).

In order for the switch network 300 to operate as a single logical switch, the individual switches 300A, 300B, 300C in the network 300 must share and coordinate their respective configuration information so as to permit the switches to coordinate their respective message forwarding and filtering decisions, "learning" of addresses of stations in segments coupled to network 200 and of the switches coupled to such segments, etc. This may be accomplished either by preconfiguring the control and forwarding logic in the switches to predesignate one of the switches as a "repository" for the switches' configuration information, either automatically after the stack discovery mode is completed, or by manually preprogramming such predesignation into the switches' control and forwarding logic. For example, the switches' control and forwarding logic may be configured to designate the switch with the lowest assigned unique identification number (e.g., switch 300A) to be the repository for the switches' configuration information.

The respective control and forwarding logic of the switches (e.g., switches 300B, 300C) other than the designated repository switch (e.g., switch 300A) may forward their respective configuration information to the control and forwarding logic of the repository switch, which may combine and store it with the repository switch's own configuration information. That is, the control and fowarding logic of switch 300C may forward its configuration information via its own internal bus to port 504, and thence via logic 600B to port 501 of switch 300B. The control and forwarding logic of switch 300B may receive this configuration via its own switch's internal bus, and forward its own configuration information and the configuration information received from switch 300C to port 502 via its own internal bus. The configuration information received by port 502 may then be forwarded to port 500 via logic 600A, and thence may be provided via the internal bus of switch 300A to the control and forwarding logic of switch 300A for storage. Alternatively, the switches' respective configuration information may be preconfigured into the control and forwarding logic of switch 300A.

The logic 600A, 600B may likewise be used to permit the respective control and forwarding logic of switches 300B, 300C to receive the combined configuration information from the control and forwarding logic of switch 300A. Thus, the switches 300A, 300B, 300C may utilize the identical configuration information when making their forwarding decisions; additionally, the switches 300A, 300B, 300C may coordinate transfer and forwarding of data messages among themselves via bus link connection logic 600A, 600B. These features permit the switches to coordinate their forwarding operations in such a way as to function together, from the vantage point of stations (e.g., router 250 and stations in segments 228, 232) outside of network 300, as a single logical switch.

For example, when a data message is received by a given switch (e.g., switch 300C) from a network segment (e.g., segment 228) in the network 300, the control and fowarding logic of that switch 300C may utilize the combined configuration information (along with the destination address and other information in the message) to determine that the message should be forwarded to another switch (e.g., switch 300B) that is coupled to a network segment (e.g., 232) in which the message's destination is located. The control and forwarding logic of switch 300C may then cause that message to be forwarded (together with appropriate forwarding control signals) via port 504 and logic 600B to port 501. Based upon these control signals, the control and forwarding logic in switch 300B may then cause the data message to be forwarded via port 304 to segment 232 wherein the intended destination station exists.

In network 200, switch network management system 401 is also provided, which system 401 includes a switch-controlled multiplexer 400, which is coupled to the switch network 300 via dedicated probe ports (collectively referred to in FIG. 2 by numerical 310) of the switches. Each switch 300A, 300B, 300C inclues a respective, dedicated probe port and associated logic 310A, 310B, 310C that couples, via a respective connection 700, 702, 704, that switch to multiplexer 400. Multiplexer 400 may comprise a conventional 1-of-3 token ring network media access unit connection system that is configured to connect, at any given time, only one of the ports 310A, 310B, 310C to connection line 706, based upon control voltages supplied to the system 400 by the ports 310A, 310B, 310C. That is, each of the ports 310A, 310B, 310C is configured to be able to controllably supply to the system 400 (i.e., via its respective connection 700, 702, or 704) voltage signals that cause the system 400 to connect the probe port supplying the voltage signals to a single conventional RMON probe 402 via connection 706; however, no more than one of the probe ports 310A, 310B, 310C may be connected by multiplexer 400 to the probe 402 at any given time. When a probe port is in this way connected to the probe 402, that port may supply raw data signals (e.g., related to operation of the switch network 300) to the probe 402. Using conventional techniques, the probe 402 may generate appropriate network management-related information based upon the raw data signals, and may make the network management-related information available to a conventional network management process 408. Although not shown in the Figures, it should be understood that communications links exist between the process 408 and managed network components that permit the process 408 to provide control messages to the managed network components.

In accordance with this embodiment of the present invention, the control and forwarding logic in the switches 300A, 300B, 300C together control supply by the ports 310A, 310B, 310C of connection control voltages to the multiplexer 400 so as to cause the ports 310A, 310B, 310C to be connected by the multiplexer 400 to the probe 402 in accordance with a round robin arbitration scheme. This arbitration scheme is implemented via a process that will be described below.

In the first step of the arbitration process used in this embodiment of the present invention, the probe port 310A of the switch 300A that is designated as the repository for the switches' combined configuration information is connected by the multiplexer 400 to the probe 402. Although not shown in the Figures, the control and forwarding logic in each switch in network 300 maintains a respective user-modifiable selection table that indicates which ports of the switch are to be monitored by the probe 402. The control and forwarding logic in switch 300A determines from its selection table which ports (if any) of the switch 300A (e.g., port 312) are to be monitored by the probe 402, and if there is more than one such port to be monitored, the control and forwarding logic also determines the sequence in which such ports are to be monitored (e.g., based upon the numerical order of identification numbers/addresses assigned to the switch's ports).

The control and forwarding logic in switch 300A then causes activity-related data of the first port to be monitored (e.g., data messages received and/or transmitted by the port during a predetermined time period) to be copied and supplied via the switch's internal bus to the probe port 310A. Thence, the activity-related data is transmitted to the probe 402 via connection 702, multiplexer 400, and connection 706. After this activity-related data has been transferred to the probe 402, the control and forwarding logic in switch 300A causes activity-related data of the next port (if any) to be monitored in switch 300A to be copied and supplied via the switch's internal bus to the probe port 310A, and thence, to the probe 402 via connection 702, multiplexer 400, and connection 706. This process continues for each of the other ports in switch 300A to be monitored (if any), until activity-related data from all such ports has been supplied to the probe 402.

When activity-related data has been supplied to the probe 402 from all of the ports to be monitored in switch 300A, the control and forwarding logic in switch 300A commands the port 310A to cause the multiplexer 400 to disconnect the port 310A from the probe 402. The control and forwarding logic in switch 300A then transmits signals (via the internal bus of switch 300A, port 500, logic 600A, port 502, and the internal bus of switch 300B) to the control and forwarding logic in the next switch 300B to be monitored by the probe 402 (e.g., the switch having an assigned identification number that is the next lowest compared to that of the switch 300A). These signals inform the control and forwarding logic in switch 300B that switch 300B is to begin providing activity-related data to the probe 402.

In response to these signals, the control and forwarding logic in switch 300B is commands its probe port 310B to cause the multiplexer 400 to connect port 310B to the probe 402. The control and forwarding logic in the switch 300B determines from its respective selection table which ports (if any) of the switch 300B are to be monitored, and if more than one of the switch's ports are to be monitored, the control and forwarding logic also determines the sequence in which such ports are to be monitored (e.g., based upon the numerical order of identification numbers/addresses assigned to the switch's ports). After multiplexer 400 connects the port 310B to probe 402, the control and forwarding logic in switch 300B causes activity-related data of the first port (if any) to be monitored to be copied and supplied via the switch's internal bus to probe port 310B.

This activity-related data is then supplied from port 310B to the probe 402 via connection 702, multiplexer 400, and connection 706. Thereafter, if there remain any additional ports in the switch 300B to be monitored, the control and forwarding logic in switch 300B copies and transmits the respective activity-related data from each such additional port to the probe 402, in succession, in the port monitoring sequence order determined by the switch's control and forwarding logic.

When activity-related data has been supplied to the probe 402 from all of the ports to be monitored in switch 300B, the control and forwarding logic in switch 300B commands the port 310B to cause the multiplexer 400 to disconnect the port 310B from the probe 402. The control and forwarding logic in switch 300B then transmits signals (via the internal bus of switch 300B, port 501, logic 600B, port 504, and the internal bus of switch 300C) to the control and forwarding logic in switch 300C (e.g., the switch having is the highest assigned identification number) indicating that switch 300C is to begin transmitting port activity-related data to the probe 402.

In response to these signals, the control and forwarding logic of switch 300C commands its probe port 310C to cause the multiplexer 400 to connect port 310C to the probe 402. The control and forwarding logic in the switch 300C determines from its respective selection table which ports (if any) of the switch 300C are to be monitored, if there are more than one such port to be monitored, the control and forwarding logic also determines the sequence order in which monitoring of such ports is to occur (e.g., based upon the numerical order of identification numbers/addresses assigned to the switch's ports). After multiplexer 400 connects port 310C to probe 402, the control and forwarding logic in switch 300C causes activity-related data of the first port (if any) to be monitored to be copied and supplied via the internal bus of switch 300C to probe port 310C. Port 310C then transmits this activity-related data to the probe 402 via connection 704, multiplexer 400, and connection 706. Thereafter, if there remain any additional ports in the switch 300C to be monitored, the control and forwarding logic in switch 300C similarly copies and transmits respective activity-related data from any such additional ports, in the sequence order for monitoring of such ports determined by the control and forwarding logic, to the probe 402.

When activity-related data has been supplied to the probe 402 from all of the ports to be monitored in switch 300C, the control and forwarding logic in switch 300C commands the port 310C to cause the multiplexer 400 to disconnect the port 310C from the probe 402. The control and forwarding logic in switch 300C then transmits signals (via the same connection path used to transmit the configuration information of switch 300C to the control and forwarding logic of switch 300A) to the control and forwarding logic in the switch 300A. In response to such signals, the control and forwarding logic in switch 300A recommences the arbitration process, beginning with the first step in such process as set forth above. The above-described round robin arbitration process may loop through these process steps indefinitely.

Using conventional techniques, the probe 402 uses the activity-related information received from the switch network 300 to generate network management-related information, which probe 402 makes available to network management process 408. Process 408 uses the network management-related information to appropriately manage components in network 200.

Thus, in the above-described round robin arbitration process, each switch in the switch network 300, in succession, provides respective activity-related data to the probe 402. The control and forwarding logic in each of the switches 300A, 300B, 300C executes program processes (not shown) for carrying out steps necessary to implement the arbitration process.

Figure 5:
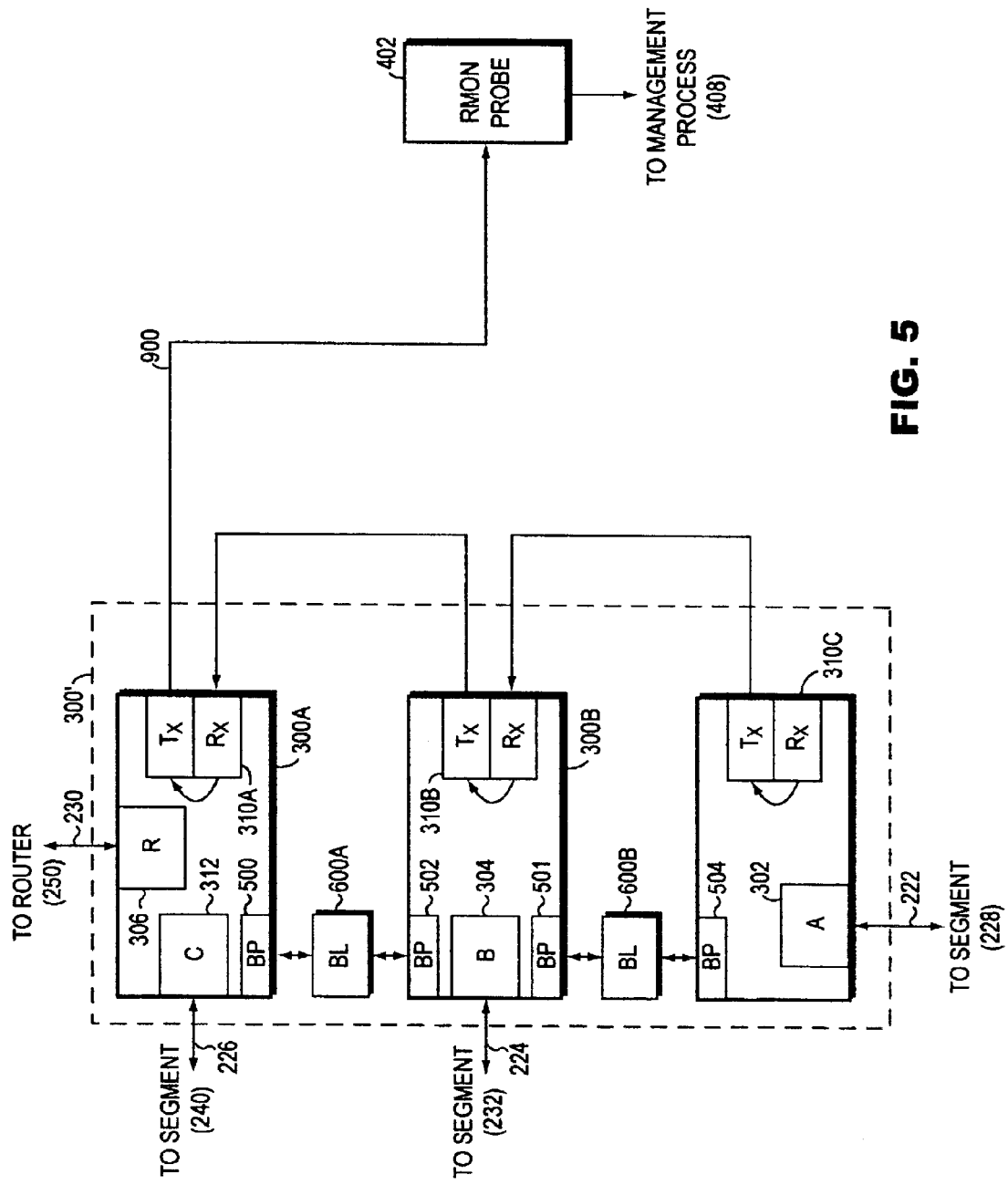
FIG. 5 is schematic, functional block diagram illustrating construction of a stacked switch network configured to employ another embodiment of the present invention.

FIG. 5 is schematic, functional block diagram illustrating construction of a stacked switch network 300' configured to employ another embodiment of the present invention. It should be understood that unless specifically stated to the contrary, the structure and operation of the network 300' are substantially the same as the structure and operation of network 300. In network 300', each of the dedicated ports 310A, 310B, 310C comprises a respective transmit portion and receive portion, referenced in FIG. 5 as RX and TX, respectively.

In this alternative embodiment, the need to use and control a multiplexer 400 is eliminated, and only a single dedicated probe port 310A is directly coupled to the probe 402, via a single connection 900. More specifically, the transmit portion TX of probe 310A is coupled via connection 900 to probe 402. The receive portion RX of port 310A is coupled to the transmit portion TX of port 310B. The transmit portion TX of port 310C is coupled to the receive portion RX of port 310B. The respective TX and RX ports in each of the ports 310A, 310B, 310C are also coupled together.

In network 300', when activity-related data of a port (e.g., port 306 or 312) in switch 300A is to be transmitted to the probe 402, it is first copied and transmitted to the switch's transmit port TX. Thereafter, the activity-related data is transmitted directly from the transmit port TX to the probe 402 via connection 900.

Conversely, if the activity-related data is of a port (e.g., port 304) in switch 300B, the data is first copied and transmitted via the internal bus of switch 300B to the transmit portion TX of port 310B, and thereafter, is transmitted by the transmit portion TX of port 310B to the receive portion RX of port 310A. The receive portion RX of port 310A then transmits the data to the transmit portion TX of port 310A, and thence, is transmitted via connection 900 to the probe 402.

Also conversely, if the activity-related data is of a port (e.g., port 302) in the switch 300C, the data is first copied and transmitted via the internal bus of switch 300C to the transmit portion TX of port 310C, which transmit portion TX then transmits the data to the receive portion of the port 310B. Thence, the data is transmitted to the transmit portion TX of port 310B, and thereafter, is transmitted by the transmit portion TX of port 310B to the receive portion RX of port 310A. The receive portion RX of port 310A then transmits the data to the transmit portion TX of port 310A, and thence, is transmitted via connection 900 to the probe 402.

Thus, in this latter network 300', the ports 310A, 310B, 310C, and the connections between them, are used solely for transmission of switch activity-related information to the probe 402.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A system for use in gathering information for use in managing a network, said system comprising:

a plurality of network switches logically organized in a stack configuration so as to operate as a single logical switch, each network switch having a plurality of ports;

an entity separate and remote from the plurality of switches for gathering said information;

a multiplexer separate and remote from the plurality of network switches for selectively connecting, according to an arbitration scheme, said plurality of network switches one at a time to said remote entity, wherein each network switch is connected to said multiplexer by a separate connection, and transmits port activity-related data that are supplied to the remote entity via the multiplexer in accordance with the arbitration scheme, and are converted by the remote entity into network management-related information.

2. A system according to claim 1, wherein said entity comprises remote monitoring probe.

3. A system according to claim 1, wherein said multiplexer comprises a network hub.

4. A system according to claim 1, wherein said multiplexer comprises a network media access unit.

5. A system according to claim 1, wherein said switches are configured to generate control signals for implementing said arbitration scheme.

6. A system according to claim 5, wherein said multiplexer is configured to be controlled by said control signals.

7. A system according to claim 1, wherein said port activity-related data comprises switch port activity information, and said switches are configured to permit user selection of particular switch port activity information to be supplied to the remote entity via the multiplexer.

8. A system according to claim 1, further comprising program processes executed by said switches for carrying out said arbitration scheme.

9. A system for use in gathering network management information, said system comprising:

a plurality of network switches configured in a stacked configuration, each switch having a plurality of ports including a probe port for receiving switch activity-related information from other ports of the respective switch;

a connection between the probe port of a first network switch to a monitoring probe that is seperate and remote from the plurality of network switches;

a means for interconnecting the network switches through their respective probe ports; and means for selectively transmitting the switch activity-related information received at the probe ports of the network switches to the seperate and remote monitoring probe, one network switch at a time, through the probe port of the first network switch, wherein the separate and remote monitoring probe converts the received switch activity-related information into network management-related information.

10. A system according to claim 9, wherein said switches are con-figured to implement an arbitration scheme for determining the order in which the activity-related information of each switch is provided to said probe.

11. A system according to claim 9, wherein said probe ports being solely for transmission of said activity-related information.

* * * * *